United States Patent
Traber et al.

[15] 3,676,561
[45] July 11, 1972

[54] ANTHELMINTIC COMPOSITIONS CONTAINING NEW CARBAMATES AND THIOCARBAMATES AND METHOD OF USE

[72] Inventors: Walter Traber, Riehen; Alfred Margot, Basel; Jean-Jacques Gailay, Baselland, all of Switzerland

[73] Assignee: Geigy Chemical Corporation, Greenburgh, N.Y.

[22] Filed: April 4, 1969

[21] Appl. No.: 835,276

Related U.S. Application Data

[62] Division of Ser. No. 549,497, May 12, 1966, Pat. No. 3,609,177.

[30] Foreign Application Priority Data

| May 18, 1965 | Switzerland | 6926/65 |
| May 18, 1965 | Switzerland | 6927/65 |
| May 18, 1965 | Switzerland | 6928/65 |

[52] U.S. Cl. ..........424/300
[51] Int. Cl. ..........A61k 27/00
[58] Field of Search..........424/300

[56] References Cited
UNITED STATES PATENTS 3,352,815  11/1967  Bencze ..........424/300

*Primary Examiner*—Sam Rosen
*Attorney*—Karl F. Jorda and Frederick H. Rabin

[57] ABSTRACT

There are disclosed anthelmintic compositions containing carbamates and thiocarbamates of the formula

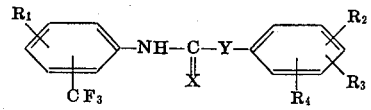

in which each of $R_1$ and $R_2$ independently represents hydrogen, halogen or halogenoalkyl; $R_3$ represents hydrogen, halogen, nitro, cyano, hydroxyl, amino, carbamoyl, sulphamoyl, phenoxy or sulphonic acid group, alkyl, alkenyl, halogenoalkyl, aralkyl, alkoxy, alkylthio, alkoxyalkyl, alkylthioalkyl, alkylsulphinyl, alkylsulphonyl, S-alkylsulphonylamino, alkylsulphamoyl, dialkylsulphamoyl, alkyl-carbamoyl, dialkylcarbamoyl, alkylamino, dialkylamino, acylamino, acyl or carbalkoxy; $R_4$ represents hydrogen, halogen or alkyl; and X and Y each independently represents oxygen or sulphur. These compositions can also be incorporated into animal feeds.

10 Claims, No Drawings

ANTHELMINTIC COMPOSITIONS CONTAINING NEW CARBAMATES AND THIOCARBAMATES AND METHOD OF USE

This application is a division of our co-pending application Ser. No. 549,497, filed May 12, 1966, now U.S. Pat. No. 3,609,177.

DETAILED DISCLOSURE

The present invention concerns new carbamates and thiocarbamates, processes for their preparation, anthelmintic compositions and feedstuffs which contain the same as active substances, their use for combatting parasitic helminths and for the prevention of helminthiasis as well as other syndromes caused by the presence of helminths, and concerns also a process for the production of such compositions. The compositions according to the invention can be either in the form of veterinary-medical preparations or of feed additives.

In the present description, the term "helminths" refers to nematodes, cestodes and trematodes i.e. to worms which infest the gastrointestinal tract, the liver and other organs.

Among endoparasites which occur in farm or domestic animals, helminths are those which cause the greatest damage to these animals. Animals attacked by them show retarded growth or poor increase in weight because of the insufficient utilization of feed given to them; moreover, injuries may occur which can result in the death of the animals. It is, therefore, of great importance to develop veterinary agents and feed additives which are suitable for combatting helminths in all stages of their development and for preventing damage caused by them (helminthiasis). Hitherto, many substances have been recommended as anthelminthics, but for various reasons they are not wholly satisfactory, be it that they show only a very specific action on certain helminths and none on others or that their action is either weak if applied in toxicologically tolerable doses or, if they are applied in effective doses, undesirable side effects appear to lead to severe organic injuries.

It has now been found that veterinary-medical agents and feed additives which contain as active ingredients carbamates or thiocarbamates of the general formula I:

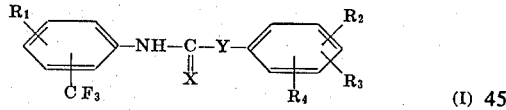

(I)

wherein each of $R_1$ and $R_2$ independently from the other represents hydrogen, halogen or a halogenoalkyl radical, $R_3$ represents hydrogen, halogen, a nitro, cyano, hydroxyl, amino, carboxyl, carbamoyl, sulphamoyl, phenoxy or sulphonic acid group, an alkyl, alkenyl, halogenoalkyl, aralkyl, alkoxy, alkylthio, alkoxyalkyl, alkylthioalkyl, alkylsulphinyl, alkylsulphonyl, S-alkylsulphonylamino, alkylsulphamoyl, dialkylsulphamoyl, alkylcarbamoyl, dialkylcarbamoyl, alkylamino, dialkylamino, acylamino, acyl or carbalkoxy radical.

$R_4$ represents hydrogen, halogen or an alkyl radical, and

X and Y each independently represents oxygen or sulphur and/or salts of these compounds falling under general formula I which contain in their molecule substituents capable of forming salts with inorganic and organic bases or acids, are very effective against helminths and that, because of their low toxicity in warm blooded animals and good tolerance by the organism, these substances are very well suited for combatting the said endoparasites and for controlling the disturbances and symptoms caused by them. The salts referred to are the acid salts of those compounds in which $R_3$ is amino and the basic salts of those compounds in which $R_3$ is carboxyl. When used as ingredients of feed additives, these substances contribute to a rapid increase in weight, better utilization of the feed, and an improvement in the general state of health of the animals. Feed additives containing these compounds have, therefore, special importance for the feeding of farm and domestic animals, in particular for that of growing animals, e.g. of young pigs, cattle, in particular farrows, calves or lambs, but also horses, dogs, rodents, fur-bearing animals, fowls, chicken, pet or caged birds.

Furthermore, these new compounds have fungistatic and bacteriostatic properties so that they can also be used as external disinfectants as well as for the protection of organic and inorganic materials.

The radicals $R_1$, $R_2$, $R_3$ and $R_4$ can represent halogen atoms up to the atomic number 35, e.g. fluorine, chlorine or bromine. As halogenoalkyl radicals, $R_1$, $R_2$ and $R_3$ are, e.g. mono- or poly-fluorinated methyl or ethyl radicals, mono- or poly- chlorinated methyl, ethyl or propyl radicals, i.e. preferably fluoro- or chloro-lower alkyl radicals. Radicals which can be symbolized by $R_3$ and $R_4$ in general formula I are optionally branched chain radicals having one to 12 carbon atoms; alkenyl radicals are those having two to five carbon atoms. By alkyl radicals which are part of a functional group mentioned above symbolized by $R_3$, those having one to 12 carbon atoms, preferably one to five carbon atoms, are to be understood. As aralkyl radicals, the benzyl and phenethyl radical can be mentioned and as acyl radicals can be mentioned aliphatic radicals such as the acetyl, propionyl or butyryl radical, and also aromatic radicals such as the benzoyl or cinnamoyl radicals, lower alkanoyl, benzoyl, lower alkanoylamino or benzoylamino radicals being preferred.

As inorganic or organic bases or acids for the preparation of the salts of those compounds falling under general formula I, which contain in their molecule substituents capable of forming salts may be mentioned for instance alkali or alkaline earth metal hydroxide, piperazine, hydrochloric acid, hydrobromic acid, sulphuric acid, phosphoric acid, naphthoic acid, embonic acid or pamoic acid.

The new carbamates and thiocarbamates of the general formula I are produced according to the invention by reacting an aniline derivative of the general formula II

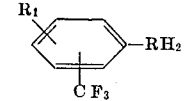

wherein $R_1$ has the same meaning as in formula I, with a phenyl halogenoformate or phenyl halogenothioformate of the general formula III

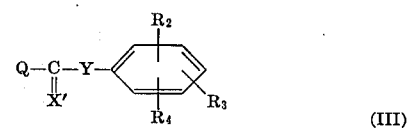

(III)

wherein $R_2$, $R_3$, $R_4$, X and Y have the same meanings as in formula I and Q represents a halogen atom such as chlorine or bromine.

The phenyl halogenoformate or phenyl halogenothioformate of the general formula III serving as starting compounds may also be formed in the reaction mixture from phosgene or thiophosgene and a phenol or thiophenol of the general formula IV

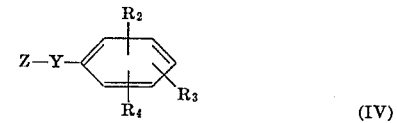

(IV)

wherein $R_2$, $R_3$, $R_4$ and Y have the same meanings as in formula I and Z represents hydrogen or an alkali metal atom.

The reaction is preferably performed in the presence of a solvent which is inert to the reaction partners such as an aromatic hydrocarbon, e.g. benzene, toluene, xylene, an aliphatic or aromatic chlorinated hydrocarbon, an ester, ketone or amide and it is advantageously performed in the presence of a proton acceptor such as an organic base, e.g. a tertiary amine such as pyridine or trialkylamine, an inorganic base, e.g. an alkali or alkaline earth metal hydroxide or carbonate. The reaction temperatures lie in the region of 0° to 60° C.

According to another mode of carrying out the process in practice, instead of an aniline derivative of the general formula II, an isocyanate or isothiocyanate of the general formula V

(V)

wherein $R_1$ and X have the same meanings as given in Formula I, is reacted with a compound of the general Formula VI

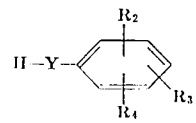

wherein $R_2$, $R_3$, $R_4$ and Y have the meanings given above, the reaction optionally being performed in the presence of an organic solvent which is inert to the reaction partners.

The salts of those compounds falling under the general formula I which have a substituent capable of forming salts are obtained by reacting said compounds with inorganic or organic bases or acids.

The new carbamates and thiocarbamates of the general formula I produced according to the processes described above, are stable in water and have good solubility in the usual organic solvents.

The following examples serve to illustrate the process according to the invention. Where not otherwise stated, parts and percentages are given by weight. The temperatures are given in degrees Centigrade.

The term "lower" used in connection with an aliphatic radical in this specification and the appended claims indicates that such radical has from one to four carbon atoms.

EXAMPLE 1

17.3 Parts of o-phenyl thiochloroformate are added dropwise, while stirring, to a 20°–25° warm solution of 39.2 parts of 3-trifluoromethyl-4d-chloraniline in 100 parts by volume of acetone. The reaction mixture is then stirred for 2 hours at room temperature (20°) and then poured into 100 parts of water while stirring. A crystalline precipitate is formed which is filtered off under suction and then washed with water. After drying, the reaction product is recrystallized from cyclohexane. The N-(3-trifluoromethyl-4-chlorophenyl)-o-(phenyl) thiocarbamate thus obtained melts at 118°–120°. Yield: 29.5 parts = 89 percent of the theoretical.

EXAMPLE 2

17.3 Parts of o-phenyl thiochloroformate are added dropwise to a 20°–25° warm solution of 19.6 parts of 3-trifluoromethyl-4-chloraniline and 7.9 parts of pyridine in 150 parts by volume of acetone, the addition being made while stirring. The reaction mixture is then stirred for 1 hour at room temperature and then poured into 1,000 parts of water while stirring. A crystalline precipitate is formed which is filtered off under suction, washed with water and then dried. After recrystallization from cyclohexane, the N-(3-trifluoromethyl-4-chlorophenyl)-o-(phenyl) thiocarbamate obtained melts at 120°–122°. Yield: 27.5 parts = 83 percent of the theoretical.

The following compounds are produced by the methods described in Examples 1 and 2:

TABLE I

| No. | $CF_3$ | $R_1$ | X | Y | $R_2$ | $R_3$ | $R_4$ | M.P., °C. |
|---|---|---|---|---|---|---|---|---|
| 1 | *3 | H | S | O | H | H | H | 109–110 |
| 2 | 3 | H | S | O | $CF_3$ 3' | H | H | 96–97 |
| 3 | 3 | Cl 4* | S | O | H | H | H | 120–121 |
| 4 | 3 | Cl 4 | S | O | --- | Cl 4'* | H | 122–123 |
| 5 | 3 | Cl 4 | S | O | H | Br 4' | H | 129–130 |
| 6 | 3 | Cl 4 | S | O | H | $CH_3$ 4' | H | 143–144 |
| 7 | 3 | Cl 4 | S | O | H | Tort.$C_4H_9$ 4' | H | 131–134 |
| 8 | 3 | Cl 4 | S | O | H | Tort.$C_8H_{17}$ 4' | H | 122–123 |
| 9 | 3 | Cl 4 | S | O | H | $CH_3O$ 4' | H | 131–132 |
| 10 | 3 | Cl 4 | S | O | H | $C_4H_9O$ 4' | H | 127–129 |
| 11 | 3 | Cl 4 | S | O | H | $CH_3CO$ 4' | H | 72–75 |
| 12 | 3 | Cl 4 | S | O | H | $NO_2$ 4' | H | 76–82 |
| 13 | 3 | Cl 4 | S | O | H | COOH 4' | H | 154–156 |
| 14 | 3 | Cl 4 | S | O | H | $CONH_2$ 4' | H | 118–121 |
| 15 | 3 | Cl 4 | S | O | H | $COOC_2H_5$ 4' | H | 83–86 |
| 16 | 3 | Cl 4 | S | O | H | I 4' | H | --- |
| 17 | 3 | Cl 4 | S | O | H | $NH_2$ 4' | H | --- |
| 18 | 3 | Cl 4 | S | O | H | $SCH_3$ 4' | H | 118–119 |
| 19 | 3 | Cl 4 | S | O | H | $SO_3H$ 4' | Cl 6' | --- |
| 20 | 3 | Cl 4 | S | O | Cl 2' | H | H | 97–90 |
| 21 | 3 | Cl 4 | S | O | $CF_3$ 3' | Cl 4' | H | 92–94 |
| 22 | 3 | Cl 4 | S | O | $CF_3$ 3' | $CF_3$ 5' | H | 92–94 |
| 23 | 3 | Cl 4 | S | O | Br 2' | Br 4' | H | 110–111 |
| 24 | 3 | Cl 6 | S | O | H | H | H | 105–106 |
| 25 | 3 | Cl 6 | S | O | H | Cl 4' | H | 102–104 |
| 26 | 3 | Cl 6 | S | O | Cl 2' | Cl 4' | H | 93–94 |
| 27 | 3 | Cl 6 | S | O | $CF_3$ 3' | H | H | 99–101 |
| 28 | 3 | Cl 6 | S | O | $CF_3$ 3' | Cl 4' | H | 75–77 |
| 29 | 3 | F 6 | S | O | H | H | H | 92–93 |
| 30 | 3 | F 6 | S | O | H | Cl 4' | H | 79–80 |
| 31 | 3 | $CF_3$ 5 | S | O | H | H | H | 107–108 |
| 32 | 3 | $CF_3$ 5 | S | O | H | Cl 4' | H | 131–132 |
| 33 | 3 | $CF_3$ 5 | S | O | Cl 2' | Cl 4' | H | 109–110 |
| 34 | 3 | $CF_3$ 5 | S | O | $CF_3$ 3' | H | H | 113–115 |
| 35 | 3 | $CF_3$ 5 | S | O | $CF_3$ 3' | Cl 4' | H | 82–83 |
| 36 | 3 | $CF_3$ 5 | S | O | $CF_3$ 3' | $CF_3$ 5' | H | 87–88 |
| 37 | 3 | H | O | S | H | H | H | 110–111 |
| 38 | 3 | H | O | S | Cl 2' | H | Cl 6' | 122–123 |
| 39 | 3 | Cl 4 | O | S | H | Cl 4' | H | 159–160 |
| 40 | 3 | Cl 6 | O | S | H | Cl 4' | H | 181–182 |
| 41 | 3 | $CF_3$ 5 | O | S | H | H | H | 153–155 |
| 42 | 3 | $CF_3$ 5 | O | S | H | Cl 4' | H | 165–167 |
| 43 | 3 | Cl 4 | S | O | H | COOH 4' | H | >300 |
| 44 | 3 | Cl 4 | S | O | H | $COONH_4$ 4' | H | 210–215 |

* The numbers designate the position of the substituents.

EXAMPLE 3

23.7 Parts of trifluoromethyl-4-chlorophenyl-isocyanate in 200 parts by volume of chlorobenzene is added at room temperature while stirring to a solution of 14.4 parts of 4-chlorothiophenol in 100 parts by volume of chlorobenzene and the mixture is refluxed for 24 hours while stirring. After evaporating off the chlorobenzene in vacuo, a crystalline residue remains which is stirred with cyclohexane and undissolved parts are removed by filtration. On evaporating off the cyclohexane, N-(3-trifluoromethyl-4-chlorophenyl)-S-(4'-chlorophenyl) dithiocarbamate is obtained as colorless crystals which melt at 101°–103°.

EXAMPLE 4

12.9 Parts of 3-trifluoromethyl-phenylisocyanate and 9.4 parts of 4-chlorophenyl are added to 100 parts by volume of anhydrous chlorobenzene and the mixture is heated under reflux for 24 hours. After evaporation of the chlorobenzene, the crude residue left in the vacuo is dissolved in warm cyclohexane and the undissolved parts are removed by filtration. On evaporating off the cyclohexane, the N-(3-trifluoromethylphenyl)-o-(4'-chlorophenyl)-carbamate is obtained which melts at 102°–104°.

The following compounds of the general formula I are obtained when using the same procedure as described in the Examples 3 and 4.

TABLE II

| Nr. | CF$_3$ | R$_1$ | X | Y | R$_2$ | R$_3$ | R$_4$ | M.P. °C |
|---|---|---|---|---|---|---|---|---|
| 1 | 3 | Cl 4* | S | S | Cl 2'* | Cl 4'* | H | 73–75° |
| 2 | 3 | Cl 4 | S | S | Cl 3' | Cl 4' | H | 82–84° |
| 3 | 3 | H | O | O | CF$_3$ 3' | H | H | 80° |
| 4 | 3 | H | O | O | CF$_3$ 3' | Cl 4' | H | 135° |
| 5 | 3 | Cl 4 | O | O | Cl 3' | Cl 4' | H | 135–137° |

*The numbers designate the position of the substituents.

EXAMPLE 5

N-(3-trifluoromethyl-4-chlorophenyl)-o-(4'-aminophenyl)-thiocarbamate hydrochloride is prepared by dissolving 10 g of the free base (Table I, No. 17) in 50 g of methanolic hydrochloric acid containing 10 percent by weight of HCl, diluting the solution with anhydrous diethyl ether until the above hydrochloride precipitates and filtering off the precipitated hydrochloride.

The carbamates and thiocarbamates of general formula I have a marked anthelmintic action against the most various types of helminths of the orders of nematodes, trematodes and cestodes in pets and domestic animals such as cattle, pigs, horses, sheep, goats, dogs, cats, furry animals and fowls.

Compounds of formula I in which X is sulfur and Y is oxygen and their salts as mentioned above are preferred. For example the compound of the formula

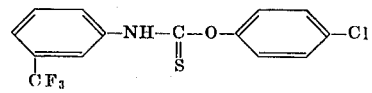

is distinguished by good activity on Ascarides, Oxyura, cestodes such as *Hymenolepis nana*, and also against nematospiroids.

Anthelmintic compositions according to the invention may contain, besides the already mentioned active ingredients, for instance also the following compounds of the general formula I

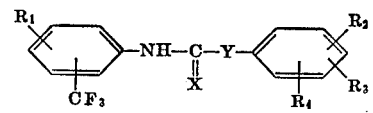

as active ingredients.

TABLE III

| No. | CF$_3$ | R$_1$ | X | Y | R$_2$ | R$_3$ | R$_4$ |
|---|---|---|---|---|---|---|---|
| 1 | 3 | F 4* | O | S | H | H | H |
| 2 | 3 | H | S | O | Cl 2* | H | H |
| 3 | 3 | F 4 | S | O | F 2 | CF$_3$ 5* | H |
| 4 | 3 | CF$_3$ 5 | O | S | Br 3 | H | Br 3 |
| 5 | 3 | CF$_3$ 5 | S | S | F$_2$ | H | H |
| 6 | 3 | Br 4 | O | S | Br 3 | Br 4* | H |
| 7 | 3 | Cl 4 | S | O | H | —CH=CH—CH$_3$ 4 | H |
| 8 | 3 | Cl 4 | S | O | H | —CH=C(CH$_3$)(CH$_3$) 4 | H |
| 9 | 3 | Cl 4 | O | O | H | —CH$_2$—C$_6$H$_5$ 4 | H |
| 10 | 3 | H | S | O | H | —C$_{12}$H$_{25}$ 4 | H |
| 11 | 3 | Cl 4 | O | O | H | —CH$_2$Cl 4 | H |
| 12 | 3 | Cl 4 | S | O | H | —O—C$_6$H$_5$ 4 | H |
| 13 | 3 | Cl 4 | S | O | H | —OCH$_2$—C$_6$H$_5$ 4 | H |
| 14 | 3 | H | O | O | H | —OCH$_2$CH—CH$_2$ 4 | H |
| 15 | 3 | Cl 4 | S | O | H | —CH$_2$OCH$_3$ 4 | H |
| 16 | 3 | Cl 4 | S | S | H | —CH$_2$CH$_2$OC$_2$H$_5$ 4 | H |
| 17 | 3 | Cl 4 | O | S | H | —CH$_2$SCH$_3$ 4 | H |
| 18 | 3 | Cl 4 | S | O | H | —CO—C$_6$H$_5$ 4 | H |
| 19 | 3 | Cl 4 | S | O | H | —COCH=CH—C$_6$H$_5$ 4 | H |

Table III—Continued

| No. | $CF_3$ | $R_1$ | X | Y | $R_2$ | $R_3$ | $R_4$ |
|---|---|---|---|---|---|---|---|
| 20 | 3 | H | O | S | H | —$SC_2H_5$ 4 | H |
| 21 | 3 | Cl 4 | S | O | H | —SO—$CH_3$ 4 | H |
| 22 | 3 | Cl 4 | S | O | H | —$SO_2$—$CH_3$ 4 | H |
| 23 | 3 | Cl 4 | S | O | H | —CN 4 | H |
| 24 | 3 | Cl 4 | S | O | H | —$N(CH_3)_2$ 4 | H |
| 25 | 3 | Cl 4 | S | O | H | —$N(C_2H_5)_2$ 3 | H |
| 26 | 3 | H | S | O | H | —$NHSO_2CH_3$ | H |
| 27 | 3 | Cl 4 | S | O | H | —$CONHCH_3$ 4 | H |
| 28 | 3 | Cl 4 | O | O | H | —$CONHC_2H_5$ 4 | H |
| 29 | 3 | H | S | O | H | —$CON(CH_3)_2$ 4 | H |
| 30 | 3 | H | O | O | H | —$SO_2NH_2$ 4 | H |
| 31 | 3 | Cl 4 | S | O | H | —$SO_2NHCH_3$ 4 | H |
| 32 | 3 | H | S | O | H | —$SO_2NHC_5H_{11}$ 4 | H |
| 33 | 3 | H | S | O | H | —$SO_2NHC_{12}H_{25}$ 4 | H |
| 34 | 3 | Cl 4 | S | O | H | —$SO_2N(CH_3)_2$ 4 | H |
| 35 | 5 | Br 2 | S | S | $CF_3$ 3 | H | H |
| 36 | 4 | H | S | O | Br 2 | —Br 4 | H |
| 37 | 2 | H | S | O | Br 2 | —Br 4 | H |
| 38 | 2 | H | S | O | $CF_3$ 3 | H | H |

*The numbers designate the position of the substituents.

Anthelmintic compositions, including feed additives according to the invention which contain as active ingredients the compounds of the general formula I and physiologically acceptable distributing agents or carriers, can be administered directly to animals in the form of solutions, emulsions, suspensions, drenches, powders, tablets or boluses or in the form of gelatin capsules, or they can be admixed to their feed.

The active substances can be administered to helminth-infested animals or to animals to be protected against helminths in the form of therapeutical preparations either as one single dose or repeatedly, the single dosage depending on the type of animal, preferably between 10 and 300 mg per kg body-weight. In some cases, better results are obtained or the total amount required for a cure can be decreased by protracted administration. The concentration in which the active substances in the form of such agents are added, e.g. to feeds or liquids given to animals are between 0.05 and 1 percent by weight.

To prepare the forms of application given above, conventional solid carriers can be used, for example kaolin, talcum, bentonite, sodium chloride, calcium phosphate, hydrocarbons, cellulose powder, carbowaxes, gelatins, or liquids such as water, if desired with the addition of surface active agents, ionic or non-ionic dispersing agents or emulsifying agents, oils and other solvents which do not injure the animal organism.

These agents can also be added in solid form to the animals' feed. Suitable carrier materials in feed concentrates (feed additives) are, among others and in addition to those mentioned above, energy-producing feed, grain feed, protein concentrates, fish meal, soya-bean meal, cotton seed meal and linseed meal. Such a concentrate, usually having a concentration of about 25 percent by weight, is then thoroughly mixed with other conventional feed additives or fillers, such as mineral agents, vitamins, antibiotics, chemotherapeutics, bacteriostatics, fungistatics, coccidiostatics, hormone preparations, substances having an anabolic action or other substances which promote growth, influence the quality of the meat of animals to be slaughtered or are useful to the animal organism in any other way. In this manner, a "premixture" (feed additive) is obtained which contains, e.g. 5–10 percent by weight of the active substance of the general formula I. A suitable amount of this premixture is then equally distributed by means of a mixer in a usual commercial food such as a grain mixture or other vegetable or animal substances. The finished feed contains the substances of formula I preferably in a concentration of about 0.001–1 percent by weight.

Tests performed on hens, mice and rats suffering from helminthiasis are described below. As has been shown in these tests, the active substances of general formula I are well tolerated by the animal organism.

TESTS ON HENS INFESTED WITH *ASCARIDIA GALLI*

1 to 3 days old chickens are artificially infested with *Ascaridia galli*. Groups each containing five chickens were used for each test. The active substances were administered 4 to 5 weeks after infestation to the animals in two doses per day over a period of 3 days (2 doses/day, 3 days). Chickens simultaneously infested but not treated serve as controls.

EVALUATION

The number of *Ascaridia galli* eliminated by each group of test animals within 5 days after the first administration of the active substance was determined daily and in addition the number of worms still found in the intestine after killing on the fifth day. Furthermore, the number of chickens free from worms was recorded.

| Active substance | daily dose in mg/kg body-weight | Ascaridia galli eliminated from 5 hens in 4 days abs. no. | in % of total no. | No. of hens free from worms |
|---|---|---|---|---|
| N, O-bis-(3-trifluoromethylphenyl) carbamate | 500 | 177 | 100 | 5 |
| N-(3-trifluoromethyl-4-chlorophenyl)-O-(3'-trifluoromethylphenyl) carbamate | 500 | 237 | 97 | 4 |
|  | 750 | 189 | 100 | 5 |
| N-(3-trifluoromethyl-4-chlorophenyl)-S-(4'-chlorophenyl) dithio-carbamate | 250 | 209 | 100 | 5 |
|  | 500 | 305 | 100 | 5 |
| N-(3-trifluoromethyl-4-chlorophenyl)-S-(3',5'-dichlorophenyl) dithiocarbamate | 500 | 68 | 100 | 5 |
| N-(3-trifluoromethyl-phenyl)-S-(phenyl) thiocarbamate | 500 | 32 | 100 | 5 |
| N, O-bis-(3-trifluoromethylphenyl) thio carbamate | 500 | 168 | 100 | 5 |
| N-(3,5-ditrifluoro- methylphenyl)-o-(3'methylphenyl)-O-(3'-trifluoromethylphenyl) thiocarbamate | 500 | 154 | 100 | 5 |
| N-(3-trifluoromethyl-phenyl)-O-(phenyl) thiocarbamate | 250 (2 days) | 28 | 45 | 4 |

TESTS ON MICE INFESTED WITH *HYMENOLEPIS NANA*

The active ingredients, in the form of a suspension, were administered by artificial feeding to white mice which had been artificially infested with *Hymenolepis nana*. Five animals were used for each test. The active ingredients were administered to each group of animals on 3 or 4 consecutive days and then the animals were killed and dissected on the eighth day after the beginning of the treatment.

The results were evaluated on dissection by counting the number of tape worms in the intestines of the killed animals. Untreated mice which had been infested in the same way at the same time served as controls.

The agents were tolerated by the mice without any symptoms.

| active substance | daily dose in mg/kg body-weight | length of treatment days | infestation of 5 animals on dissection | infestation of control animals on dissection |
|---|---|---|---|---|
| N-(3-trifluoromethyl-phenyl)-O-(3'-trifluoromethyl-4'-chlorophenyl) carbamate | 1000 | 3 | 0 0 0 0 0 | 6 14 6 5 13 |
| N-(3-trifluoromethyl-5-chlorophenyl)-S-(2',4'-dichlorophenyl) dithiocarbamate | 500 | 3 | 0 0 0 0 0 | 3 2 12 2 4 |
| N-(3,5-ditrifluoro-methylphenyl)-O-(3'-trifluoromethylphenyl) dithiocarbamate | 100 | 4 | 0 0 0 0 0 | 9 8 11 14 6 |
| N-(3-trifluoromethyl-4-chlorophenyl)-O-(4'-chlorophenyl) thiocarbamate | 400 | 3 | 0 0 0 0 0 | 9 8 11 14 6 |

TESTS ON RATS INFESTED WITH *FASCIOLA HEPATICA*

White laboratory rats are artificially infested with liver flukes (*Fasciola hepatica*). On completion of the prepatency time, the infestation of the rats by liver flukes is checked for the presence of liver fluke eggs in the faeces on three different days.

For each test, two infested rats are treated once daily for three consecutive days with the active substance which is applied orally in the form of a suspension. Within the third and fifth week after administration of the active substance, the faeces are analyzed once a week to determine the presence or absence of eggs of liver flukes. At the end of the fifth week the test animals are killed and examined for the presence of liver flukes.

| active substance | daily dose in mg/kg body weight | control of elimination of eggs 3 times | | number of liver flukes on dissection |
|---|---|---|---|---|
| | | before medication | after medication | |
| N-(3,5ditrifluor-omethylphenyl)-O-(3-trifluoromethyl-phenyl) thiocarbamate | 50 | positive | negative | 0 |
| N,O-bis-(3-trifluoromethylphenyl) thiocarbamate | 50 | positive | negative | 0 |
| N-(3-trifluoro-methyl-4-chloro-phenyl)-O-(4'-chlorophenyl) thiocarbamate | 100 150 | positive positive | negative negative | 0 0 |

The following examples describe the production of anthelmintic agents according to the invention. Parts are given therein as parts by weight.

EXAMPLE I

A powder is produced by intimately mixing and milling 50 parts of N-(3-trifluoromethylphenyl)-o-(3'-trifluoromethyl-4'-chlorophenyl) carbamate, 30 parts of Microcell, 19.5 parts of kaolin and 0.5 parts of ethylene oxide-propylene oxide condensate (the product sold under the commercial name "Pluronics F 68"). On stirring this pulverulent mixture with water, a pulpy concentrate is obtained which is particularly well suited for administration to pets and domestic animals.

EXAMPLE II

An anthelmintic 10 percent feed concentrate mixture of the following constitution was produced:
10 parts of N-(3-trifluoromethyl-4-chlorophenyl)-S-(4'-chlorophenyl) dithiocarbamate, were added to
90 parts of a feed containing:
4-5 parts of roughage,
20 parts of crude protein,
64-65 parts of total nutrients,
8-11 parts of vitamins and quartz sand.

This mixture was mixed with standard chicken feed and was fed to hens infested with Ascaridae. The concentration of active substance in the feed was 0.25–0.5 percent. In the days following this treatment, great elimination of Ascaridae by the hens was determined. There were no more Ascaridae or eggs thereof in the faeces in the following 6 weeks.

EXAMPLE III

A 50 percent powder of the following composition:
50 parts of N-(3,5-ditrifluoromethylphenyl)-o-(3'-trifluoromethylphenyl) thiocarbamate
2 parts of tylose/kaolin mixture 1:1
0.8 parts of sodium benzoate
0.05 parts of sodium lauryl sulphate
5 parts of sorbitol monostearate
42.15 parts of white flour,
is produced by intimately mixing the individual components. This powder is mixed with pulpy or dry feed concentrate and is fed for 3 days to pigs infested with nematodes. After feeding the pigs for 14 days normally with usual feed concentrate, the pigs are again so fed. After this second treatment, the animals are free of worms to all intents and purposes.

EXAMPLE IV

10 Parts of N-(3,5-ditrifluoromethylphenyl)-o-(3'-trifluoromethylphenyl) thiocarbamate are intimately mixed with 90 parts of a nutritionally well balanced nutrient feed to form an additive to animal feeds. The nutrient feed consists of:

| | |
|---|---|
| roughage | 4.5% |
| crude protein | 18.5% |
| digestible protein | 15.7% |
| total nutrients | 66.5% |
| vitamin A | 9000 i.U/kg |
| vitamin D$_3$ | 1200 i.U/kg |
| vitamin B$_2$ | 6 mg/kg |

The feed additive can be fed to pigs and sheep as such in a measured quantity or, as a 0.03–0.001 percent mixture (calculated on the active substance), it can be admixed with the usual feed. The higher dosage can be given for a short time or the lower dosage over a longer period. The general condition of the animals is improved and, with this, better increase in weight is attained.

EXAMPLE V

N-(3-trifluoromethyl-4-chlorophenyl)-o-(4'-chlorophenyl) thiocarbamate is mixed with dextrin or sugar to form a 20 percent concentrate. 1 g of this mixture is dissolved in 4 liters of full cream milk and the solution is given to 10–20 day old calves once daily for 4 weeks. The calves fed in this way with 50 mg of active substance per liter milk showed an about 5 percent better increase in weight after 4–5 months than those which received no additive in the milk.

We claim:

1. An anthelmintic composition for veterinary-medical purposes, to be taken orally comprising can anthelmintically effective amount of a substance selected from among (a) a compound of the general formula

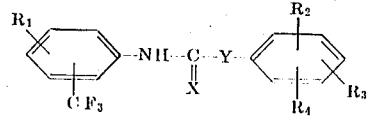

(1)

wherein
- each of $R_1$ and $R_2$ independently represents hydrogen, halogen or halogenoalkyl,
- $R_3$ represents hydrogen, halogen, nitro, cyano, hydroxyl, amino, carboxyl, carbamoyl, sulphamoyl, phenoxy, sulpho, alkyl, alkenyl, halogenoalkyl, benzyl, alkoxy, alkylthio, alkoxyalkyl, alkylthioalkyl, alkylsulphinyl, alkylsulphonyl, S-alkylsulphonylamino, N-alkylsulphamoyl, N,N-dialkylsulphamoyl, N-alkylcarbamoyl, N,N-dialkylcarbamoyl, alkylamino, dialkylamino, acylamino, acyl or alkoxycarbonyl,
- $R_4$ represents hydrogen, halogen or alkyl, and each of X and Y independently represents oxygen or sulphur;

(b) a salt, acceptable for veterinary purposes, of a compound of formula I in which $R_3$ is amino, with an acid; and (c) a salt, acceptable for veterinary purposes, of formula I in which $R_3$ is carboxyl, with a base; said compound or salts being in admixture with a physiologically acceptable distributing agent or carrier compatible with the anthelmintically active component.

2. A composition as defined in claim 1, wherein said compound is of the formula

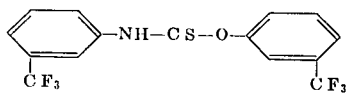

3. A composition as defined in claim 1, wherein said compound is of the formula

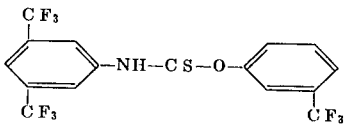

4. A composition as defined in claim 1, wherein said compound is of the formula

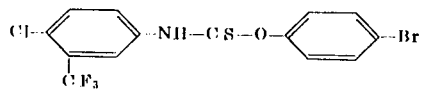

5. A composition as defined in claim 1, wherein said compound is of the formula

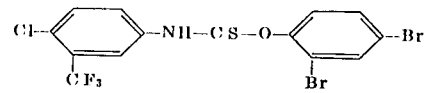

6. A composition as defined in claim 1, wherein said compound is of the formula

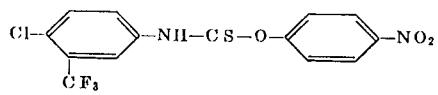

7. An anthelmintic composition as defined in claim 1 which is in the form of a preparation of from liquid to solid consistency for oral or abomasal administration.

8. An anthelmintic composition as defined in claim 1 which is in the form of a feed additive mixture of from solid to liquid consistency.

9. A method for combatting helminths in domestic and farm animals and for the mitigation and prevention of damages and troubles caused by these helminths, which comprises administering orally to such animal an anthelmintic composition as defined in claim 1.

10. A method as claimed in claim 9, wherein said composition is administered in an amount of between 10 and 300 mg per kg bodyweight of the treated animal.

* * * * *